US007340096B2

(12) United States Patent
Stauder et al.

(10) Patent No.: US 7,340,096 B2
(45) Date of Patent: Mar. 4, 2008

(54) METHOD FOR IDENTIFICATION OF TOKENS IN VIDEO SEQUENCES

(75) Inventors: Jürgen Stauder, Montreuil/Ille (FR); Bertrand Chupeau, Rennes (FR); Lionel Oisel, La Nouaya (FR); Louis Chevallier, La Méziére (FR)

(73) Assignee: Thomson Licensing, Boulogne-Billancourt (FR)

( * ) Notice: Subject to any disclaimer, the term of this patent is extended or adjusted under 35 U.S.C. 154(b) by 779 days.

(21) Appl. No.: 10/800,988

(22) Filed: Mar. 15, 2004

(65) Prior Publication Data

US 2004/0183825 A1 Sep. 23, 2004

(30) Foreign Application Priority Data

Mar. 19, 2003 (EP) .................................. 03290696

(51) Int. Cl.
*G06K 9/46* (2006.01)
(52) U.S. Cl. .............................. 382/190; 352/3; 352/12; 382/171
(58) Field of Classification Search ..................... None
See application file for complete search history.

(56) References Cited

U.S. PATENT DOCUMENTS

| | | | |
|---|---|---|---|
| 5,809,161 A | 9/1998 | Auty | |
| 5,969,755 A | 10/1999 | Courtney | |
| 2001/0005430 A1 | 6/2001 | Wamick | |
| 2002/0051575 A1* | 5/2002 | Myers et al. | ................ 382/202 |

FOREIGN PATENT DOCUMENTS

| | | |
|---|---|---|
| EP | 1085456 A2 | 3/2001 |
| EP | 1085456 A2 | 3/2001 |
| WO | WO97/37489 | 10/1997 |
| WO | WO 97/37489 | 10/1997 |

OTHER PUBLICATIONS

M. Cooper and J. Foote, Scene Boundary Detection Via Video Self-Similarity Analysis, Oct. 7, 2001, Proceedings of the International Conference on Image Processing.*
Product data sheet Bones Dailies linked from http://www.grassvalley.com/docs/DataSheets/film/bones_dailies/FIL-1020D.pdf, 2 pages.*
Product literature of SpeedGrade DDS from IRIDAS from website http://www.speedgrade.com/dds/, 3 pages.*
Search Report dated Sep. 3, 2003 also enclosed.

* cited by examiner

*Primary Examiner*—Brian P. Werner
*Assistant Examiner*—Thomas M Redding
(74) *Attorney, Agent, or Firm*—Joseph J. Laks; Ronald H. Eurdyla; Joel M. Fogelson

(57) ABSTRACT

A method for identifying of tokens in a video sequence is described. First, the video sequence is scanned for boundaries between consecutive parts of the sequence where the appearance of the tokens is expected. After that step, candidate regions are pre-selected and classified in parts of the video sequence adjacent to detected boundaries, and tokens are located in the candidate regions. Information carried on the tokens is located, interpreted, and merged into consistent sets of information after passing a confidence analysis. In parallel a change in the visual appearance of a token, signaling a special event, is detected.

15 Claims, 3 Drawing Sheets

METHOD FOR IDENTIFICATION OF TOKENS IN VIDEO SEQUENCES

This application claims the benefit under 35 U.S.C. § 119 of EPO Application No. 03290696.8 filed on Mar. 19, 2003.

FIELD OF THE INVENTION

The invention relates to a method for identification of tokens in video sequences and the extraction of data contained thereon.

BACKGROUND OF THE INVENTION

In film productions, tokens are frequently used to indicate the start of new take or shot. These tokens may, inter alia, appear in the form of slates, often also referred to as clapperboards, clapboards or clappers. Other tokens can be vehicle license plates, traffic signs or posters. In a larger sense, tokens can be any objects having typical appearance and having readable symbols on it.

The term slate is used in the specification as a synonym of the term token.

In the following, the term slate is used interchangeably as a synonym of a token where appropriate for better understanding.

Slates typically have a body and a hinged arm, which is slapped against the body at the beginning of the take. Slates can additionally contain written, printed or electronically displayed information about the take. This information may include production title, scene title, take title, take number, date and time.

When producing a film, individual scenes are often taken repeatedly until the director is satisfied with the results or in order to have different views of the same scene for later selection. At the beginning of a take the slate is filmed and the slate arm is slapped to the slate body. The slapping of the slate may be used during post-processing for synchronizing the audio and video tracks. During a day of film production, a number of takes are captured, possibly by multiple cameras. Each camera will deliver one or more video sequences. Each video sequence—also called daily—contains a number of takes, up to several hundred. The video sequences may physically be contained on film rolls, magnetic tapes, hard disc drives (HDD), optical discs or other types of media. The format may be analog, digital, uncompressed or compressed, e.g. according to the MPEG standard. In general, accompanying audio tracks are captured with audio tools and stored on specific audio media.

After production, the dailies are post-processed. During post-processing the various takes are reviewed for quality and/or acceptability by the director and/or the cutter for identifying the take which will be used for the completed film. In order to find the beginning of a respective take, the video sequence is reviewed for the occurrence of slates. The correct and reliable identification of slates is important for several reasons. First, detected slates indicate the start of a new take. Second, extracted information from slates is necessary for shot processing. Third, identified slates assist in the synchronization of dailies with audio tracks. Audio-visual synchronization is realized either by using audio information from the slate or by detecting the time instant when the arm of the slate makes contact with the body. More recently introduced slates incorporate an electronic display, which continuously displays a time code. A time code control may then synchronize the time code in a sound recording apparatus and a camera. By doing so it is possible to assign to each image the accompanying sound information.

Until today, the process of searching slates in recorded material is often done manually, which is time consuming and sometimes cumbersome. Manual slate identification requires manually cueing or rewinding the recording to the occurrence of a slate, i.e. slate detection, and extracting the information on the slate. This task is performed by an operator using a video terminal with playback/forward/backward functions. The information from the slates is then read and manually entered into an audio-visual synchronization tool. After that, for synchronization purposes, the status of the slate arm has to be detected, i.e. the slapping of the arm to the body.

In view of the time consuming manual process of detecting the occurrence of a token in a video sequence, manually extracting the information on the token and entering the information into a synchronization tool, it is desirable to provide a method for automatically performing this task.

SUMMARY OF THE INVENTION

The invention disclosed hereinafter therefore provides a method for automatically screening video sequences, detecting the occurrence of tokens, extracting the information and providing the information to editing tools, or other means of post-processing.

According to the method of the invention, a video sequence is scanned for boundaries between individual takes. Boundary scanning comprises creating a histogram from image properties for consecutive images. A histogram may advantageously be derived from the luminance signal of a video sequence. However, the invention is not limited to this signal, and other signals, signal components, e.g., chrominance, or other image properties may be used. Histograms may also be derived based on low resolution versions or filtered versions of the images from the video sequence. Using low resolution images advantageously reduces the computational power required. The filtering may comprise, e.g., low-pass filtering to reduce high frequency image components, although other filtering techniques are conceivable, depending on the representation of the video signal and the image property selected for creation of the histogram. In another embodiment, the histogram is derived using DC or low-frequency coefficients of an image transform of images from the video sequence. An applicable common image transforms are of DCT (discrete cosine transform) type. The histograms may further be subject to filtering. Then, the distance between the histograms of images is calculated. In the event that the distance calculated exceeds a preset threshold, a signal is issued, which indicates detection of a boundary. After a boundary is detected, candidate regions in the images following the boundary, so called candidate images, are scanned. Images may be frames of progressive video or fields of interlaced video and are, for the sake of clarity, referred to hereinafter as images. It is assumed, that a slate occurs within a certain time after the beginning of a take, e.g. within the first 45 seconds of a take. Therefore, and in order to detect false boundary detection, a timer is started, which stops the process after a certain time or length of the video sequence has been processed without producing a reasonable result. It is also possible to start searching for tokens on both sides of the detected boundary. To reduce computational load and to improve the detection rate, only a limited number of images of high image quality may be selected as candidate images. For compressed video, the candidate images may be intra-coded frames, also referred to as I-frames. The candidate images can also be sub-sampled, or, in interlaced video, only one field may be used. Candidate image scanning is stopped when a timer time-out occurs, as mentioned above, or when other steps of the method, produce a reasonable result, e.g. the information of a slate was correctly extracted and/or the slate arm status detection routine signals successful termination. The scanning comprises pre-selecting candidate regions in candidate images, which are regions in which slates are likely to be found. Pre-selection of candidate regions aims to output a high number of candidate regions such that a very high recognition rate is accomplished. A high recognition rate means that nearly all slates are included in candidate regions. At the same time the pre-selection may have low precision. Low precision means that there are many false detections among the candidate regions. Before the pre-selection of candidate regions is begun one or multiple reference feature value sets corresponding to one or multiple types of tokens are computed from a reference image or a training set of multiple reference images. The reference feature value set is, e.g., extracted from the pixel values of an image or of a rectangular bounding box. E.g., a color histogram may be used as a basis for a feature value set. An efficient histogram type is, e.g., a histogram of 512 bins, obtained from a non-linear quantization of YCrCb space (Y representing luminance and Cr and Cb red and blue chrominance), where Y, Cr and Cb represent axes defining the three dimensions of space. For quantization, each color axis is divided into equally sized classes. Rather coarse division is made for luminance Y, e.g. 8 classes, and a finer subdivision is made for the two chrominance axes Cr and Cb, e.g. 128 subdivisions. Depending on the slate type to be detected, the color histogram is computed inside a suitably shaped area, e.g. a rectangular bounding box, or inside a sub-region of the area. Electronic slates usually contain typical areas of alternating colors, called color zebras, and electronic digits on the upper half, while the lower part is less discriminatory with respect to the background content. Here, the color histogram is computed in the upper half of a rectangular bounding box. However, the feature value set may be generated using only part of the image information, e.g., the luminance only, or based on other image properties, depending on the image representation. During the process of pre-selecting candidate regions, each candidate image is spatially scanned by the suitably shaped scanning window—also referred to as the candidate bounding box—at varying spatial locations, with different window sizes and with different aspect ratios corresponding to different slate types. The scanning window may advantageously have a rectangular shape, but the invention is not limited to a certain shape of the scanning window. An overlap of multiple candidate bounding boxes may occur.

A distance between a bounding box, or scanning window, and a reference feature value set can be computed as the distance between two histograms, the histogram for the reference feature value set and the histogram for the bounding box. This distance may also be referred to as visual distance. A simple histogram intersection distance, i.e. the sum of bin-to-bin absolute values of differences, may be used. A feature value set is computed for each scanning window and each window location and compared to the reference feature value sets. Programs for fast computation of feature value sets at multiple locations and for fast determination of a list of several "best match" candidate regions are available on the software market, e.g. a software for optical inspection of printed circuit boards may be used as a basis.

The pre-selection module eventually provides a list of bounding boxes, possibly with different sizes, ordered with increasing distance to the reference feature value sets. The list may be truncated for performance reasons. The resulting bounding boxes are called candidate regions.

The candidate regions are then classified, and tokens are located in the candidate regions. At the beginning of classification, one or several classifiers corresponding to one or several token types are learned from one or several training sets of example images. The images of a training set, e.g., either show a token or do not show a token. For each image it is known whether a token is shown or not. For learning from a training set, two steps are carried out. In a first step, feature values are calculated from the pixels of each image. Feature values may be color or luminance histogram values, edge direction histograms, wavelet subband energies or other known visual image feature values or combinations thereof. Then, in a second step, support vectors in the feature value space are extracted by a Support Vector Machine (SVM). A reference model is in this case a set of J vectors $\{v_j, 0 \leq j \leq J, v_j \epsilon R^N\}$ where N is the number of feature values. Other learning methods such as k-means clustering or neural networks may also be used.

Then, feature values are extracted from the pixels in each candidate region and classified into token or non-token according to the learned classifier. A classification confidence value is associated to the classification result. The co-pending European patent application No. 02090360.5 titled "Method and apparatus for automatically or electronically calculating confidence measure values for the correctness or reliability of the assignment of data item samples to a related one of different data class" proposes confidence measures for SVM classifiers and k-means-clustering-based classifiers.

For each candidate image a final processing is applied to all classified candidate regions. When there are more than one candidate regions classified as token, a limited number of candidate region with the highest confidence values are selected and output. If there is no candidate region classified as token, no candidate region is output and the classification confidence is the average value of confidence values from all candidate regions.

One example of feature values used for classification is described in the following. 25 feature values are used. All 25 feature values are calculated from all pixels of a given image (for learning) or a given candidate region (for prediction). 12 feature values are extracted from a 12-bin short color histogram. The short color histogram is calculated by linear quantization from the original color histogram such as described for pre-selection. The $13^{th}$ value is extracted by ordering the original color histogram with respect to increasing bin-values. From the ordered histogram, a cumulative histogram is calculated. Let the n-th bin of the cumulative histogram be—in increasing order—the first that is equal or higher than a given threshold Th1. The $13^{th}$ feature value is set to n. A typical threshold Th1 is 0.90. The last 12 feature values are extracted from a 12-bin edge direction histogram.

For edge histogram calculation, the given image or candidate region is low-pass filtered and edge pixels are detected, for example using a Deriche filter. The detected edge pixels are connected to form continuous edges using, e.g., a gradient analysis in the local neighborhood of edge pixels. The continuous edges are polygonized. The directions of the resulting polygons are described by the edge direction histogram.

Before learning of classifiers, described feature values are normalized with respect to their standard deviation and mean estimated from the learning sets. The same estimations of mean and standard deviation are used to normalize feature values extracted from a candidate region before application of the classifier.

For locating of tokens, one or several reference images showing one or several types of tokens, respectively, are selected. Then, a number of candidate regions that are classified as tokens and having best classification confidence values are selected. For each selected candidate region, a number of candidate bounding boxes is defined. The size of candidate bounding boxes varies and is defined by a set of size factors with respect to the considered candidate region. For example eight size factors 1.0, 1.25, 1.5, ... 2.75 may be used. For each size factor, a number of candidate bounding boxes with varying positions are generated. The positions vary horizontally and vertically. The distance between two close candidate bounding boxes is defined by a step factor with respect to the bounding box size. E.g., a step factor of 0.1 may be used. The candidate bounding boxes cover in a regular manner an image area centered around the considered candidate region and having a size of, e.g., 2.25 times the size of the considered candidate region. For each candidate bounding box correlation coefficients are calculated. In the YPrPb color representation coefficients may advantageously be calculated as one for the luminance Y and two for the chrominance Pr, Pb. Other coefficients may be used for other representations of the images, or only some of the possible number of coefficients may be calculated. The correlation is carried out between the pixels of the candidate bounding box and at least one reference image. Before correlation, the candidate bounding box may be decimated or interpolated in its spatial resolution. The reference image may also be decimated or interpolated such that the number of pixels of the reference image and the candidate bounding box finally correspond. The correlation coefficients are averaged to define a matching confidence value. For averaging, weighting factors may be used such that either the luminance or a chrominance has more influence than the others. For example, the luminance and chrominance Cr can be averaged and chrominance Cb is weighted by zero, i.e. not used. For each selected candidate region, the token location is indicated by the "best match" candidate bounding box, i.e. having highest matching confidence value. The highest matching confidence value serves as location confidence value. If the location confidence value is lower than a threshold Th2 a selected candidate region may be re-classified to "not being a slate". A typical value for the threshold Th2 is, e.g., 0.4.

After the token is located, areas carrying information on the token are located, and the information is extracted. This information may include handwritten text, printed text and electronically displayed text. One example for electronically displayed text is a time-code display in red LED digits on current slate types. A slate with an electronic time-code display is used in the scene of FIG. 3. In this case, information extraction aims at determining the numerical value associated with the time-code located on the slate. Information extraction comprises information locating and information interpretation.

The input to information locating is a candidate image showing a token and token location data (e.g., position and size of a bounding box). The orientation of the token is supposed to be unknown. For information locating a rectangular sub-image, which circumscribes the area carrying information, is cut from the candidate image. In the case of a slate with electronic digits, the area with the electronic digits is selected. The size and position of the sub-image is computed from the token location by applying two pre-defined ratios on its height and width. These ratios differ for different token types. The sub-image may be pre-processed. Pre-processing may comprise filtering and/or sub-sampling in order to obtain a smaller image (e.g. 40×30 pixels). Then, a probability map is constructed. For each pixel of the sub-image, or the pre-processed version thereof, a value representing the probability for this pixel belonging to a digit is computed. This probability is obtained, e.g., by comparing pixel color values of the sub-image to a color digit probability distribution previously learned from a large database of digit pixels. Other methods for obtaining a probability map are conceivable, e.g., methods based on shape analysis or the like, and other image properties may be used to generate the probability map, e.g. the luminance, or contrast between two neighboring pixels. The last step is finding the digit area rectangle that has maximum digit color probability. This digit color probability is taken as the average of the probabilities associated with all the pixels belonging to the considered rectangle. The optimizing scheme is a full search based algorithm. For each possible position of the center and each possible rotation of the rectangle the probability value is computed. The resulting rectangle corresponds to the one with maximum probability value.

For information interpretation, the located information is extracted from the probability map. If necessary, the area carrying information is rotated such that the digits are horizontally oriented. Then, the probability map values are binarized, e.g., by applying an adaptable threshold obtained by using a clustering algorithm that groups probability values into two clusters (digit or not digit). Binarizing means transferring the individual multi-bit pixel values into single bit pixel values. The binarized map may then be filtered, e.g. by applying morphological filtering using, e.g., closing and skeleton operators. Morphological operations manipulate shape, attempting to preserve essential shape while discarding irrelevancies. Skeleton and closing operations are, amongst others, commonly known in the field of image processing. The closing operation can fill in small holes, or gaps, in an image and generates a certain amount of smoothing on an object's contour. Closing smoothes from the outside of an object's contour. The skeleton operation tries to generate a representation of an object's essential shape, which is a one pixel thick line through the "middle" of an object, while preserving the topology of the object. The filtering applied is not limited to morphological filtering. Depending on the data and the further processing, other types of filtering are conceivable.

A classical OCR (Optical Character Recognition) method is then used to obtain the numerical information displayed by the digits, e.g. the time code. The OCR may also provide an interpretation confidence value for each digit, representing the probability that an information element was extracted and interpreted correctly. A confidence analysis is then performed on the information elements and the confidence values. Confidence analysis may comprise a consistency check across information extracted from consecutive images. A confidence analysis for electronically displayed time-code on slates may comprise, e.g., processing all time-codes detected in all candidate images using confidence values delivered by the OCR. Additionally, detected time-codes can be compared in consecutive images to verify the requirement that time-codes increase linearly with time. Due to errors in information extraction, this requirement may not always be fulfilled. Therefore, information element merging comprises replacing digits having low interpretation confidence or contradicting time information with interpolated digits such that the time requirement is fulfilled. This process outputs verified time-codes for at least one candidate image.

Finally, the information elements of all slates found in all consecutive candidate images are merged into a single, consistent set of information in order to eliminate false information.

In parallel, when a token is located, changes in the visual appearance are monitored. If the token is, e.g., a slate, the status of the slate arm is monitored in order to detect the closing of the slate arm. The visual appearance may also change in other ways, e.g., sudden or gradual change of colors or brightness, rotation, tilting, articulated motion, flipping the token over, or the like.

Monitoring the change of visual appearance shall in the following be exemplarily described for the slate arm status of a slate, i.e., slate arm open or closed. The monitoring process comprises detection of the slate arm, monitoring the movement of the slate arm and finally detection of slate arm closing, i.e., the slate arm making contact to the slate body.

For detecting a slate arm firstly a scanning window having a suitable shape is defined inside the considered candidate image. Amongst other possible shapes, e.g., trapezoid or circular, a rectangular scanning window may be preferred. The search window is defined based on data from the slate location process and with respect to predefined slate types. Visual feature values are classified into classes "slate arm" and "no slate arm", and a matching process similar to that of slate locating is carried out to locate the slate arm. Visual features comprise, inter alia, color, pattern and texture, or combinations thereof. Depending on the representation of the images in the color space, e.g., YPrPb, only part of the available image information may be used for the definition of the visual features. Once the slate arm is located, the movement of the slate arm is monitored in consecutive images. Information about the slate arm position with regard to the slate body is output for further processing.

For simplified monitoring of the slate arm's movement, the slate may be translated into a basic model, e.g., consisting only of rigid, but articulated bodies describing, e.g., the outline of the slate and the slate arm. For slate arm modeling several consecutive candidate images are analyzed by application of an articulated motion model. The motion model follows the motion of the slate arm. The articulation is the point where the slate arm is hinged to the slate body. The modeling process determines the following unknowns: Slate arm rotation angle, coordinates of articulation, orientation and inclination of slate. The unknowns can be estimated using well-known motion-estimation methods, for example feature matching, block matching or gradient method.

The arm closing detection analyses the motion estimation results and detects the time instant where the slate arm makes contact with the slate body. This can be accomplished by a dynamic motion model as for example the model of accelerated rotation. All along the candidate images, rotation angle, speed and acceleration of slate arm are estimated. Slate arm closing is detected when estimated slate arm rotation angle no longer follows the motion model, i.e. when the motion stops. The information output for further processing may comprise slate arm rotation angle and/or a binary value describing the slate arm status, i.e. opened or closed.

The process is ended when a slate is detected properly and usable information is extracted, or, as mentioned above, when a time-out of the timer occurs.

Before any processing as described before is applied, a given image, a given candidate region, or the data associated thereto, may be pre-processed. Pre-processing may enable or support the processing algorithm. Pre-processing may comprise, e.g., histogram equalization, filtering, or contrast stretching, depending on the processing to be executed.

BRIEF DESCRIPTION OF THE DRAWINGS

Individual steps of the inventive method will be described hereinafter in detail with reference to the drawing. In the drawing, FIG. 3b shows an enlarged detail of FIG. 3a.

In the drawing, identical or similar elements are assigned identical reference numerals or designator.

DETAILED DESCRIPTION OF THE PREFERRED EMBODIMENTS

Figure 1:
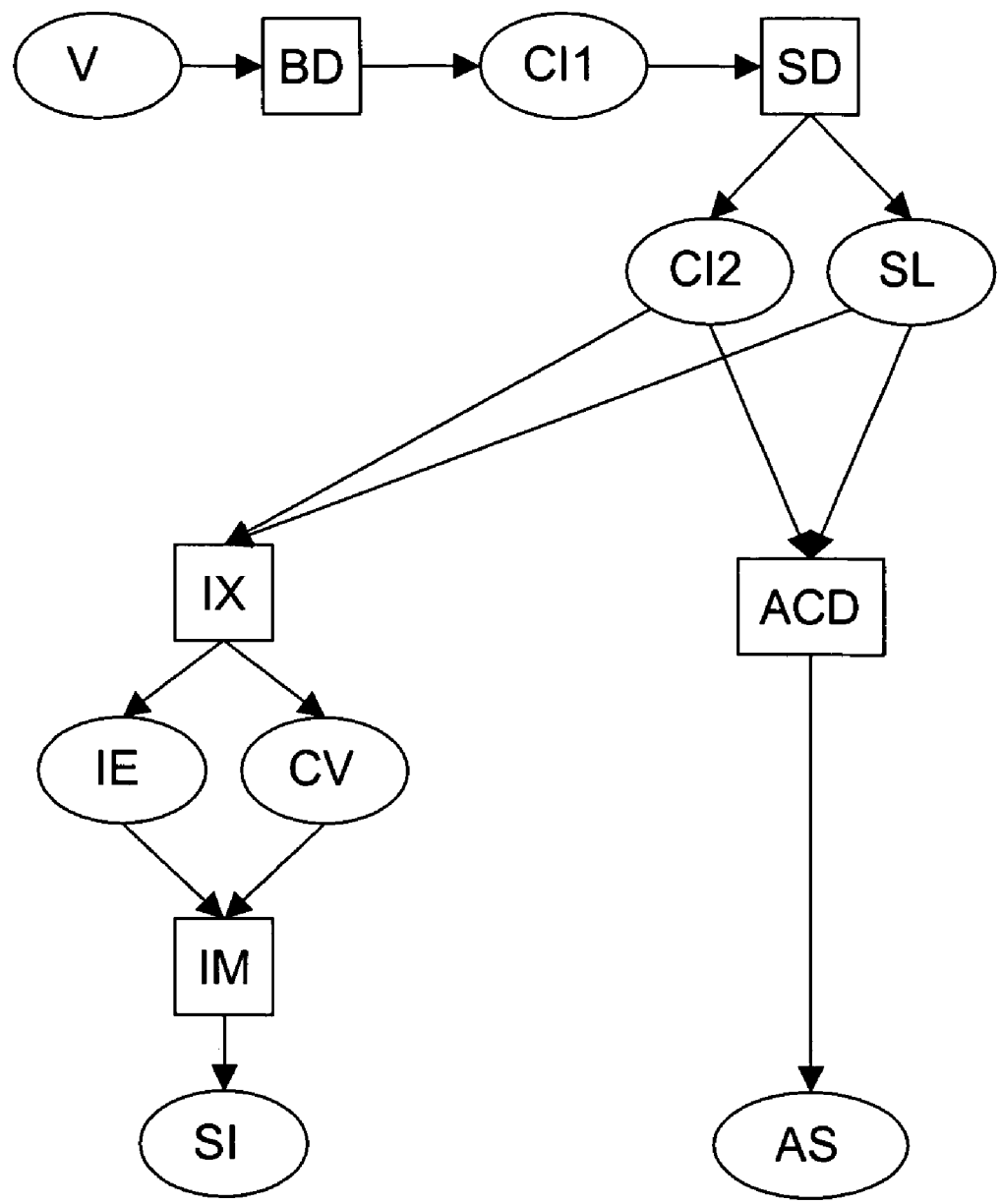
FIG. 1 shows a basic chart of the overall process.

In FIG. 1 a basic chart of the overall method is shown. A video sequence V is subject to boundary detection BD in order to detect the beginning of a take. The boundary detection BD outputs first candidate images CI1, which are subject to slate detection SD. The slate detection SD outputs second candidate images CI2 and data on the slate location SL. In a first branch of the method the second candidate images CI2 and slate location data SL are processed for information extraction IX. The information extraction delivers information elements IE and associated confidence values CV to the information merging process IM. The information merging outputs slate information SI for further processing. In a second branch the second candidate images CI2 and slate location data SL are used for slate arm closing detection ACD. The slate arm closing detection ACD outputs data on the slate arm status AS for further processing.

Figure 2:
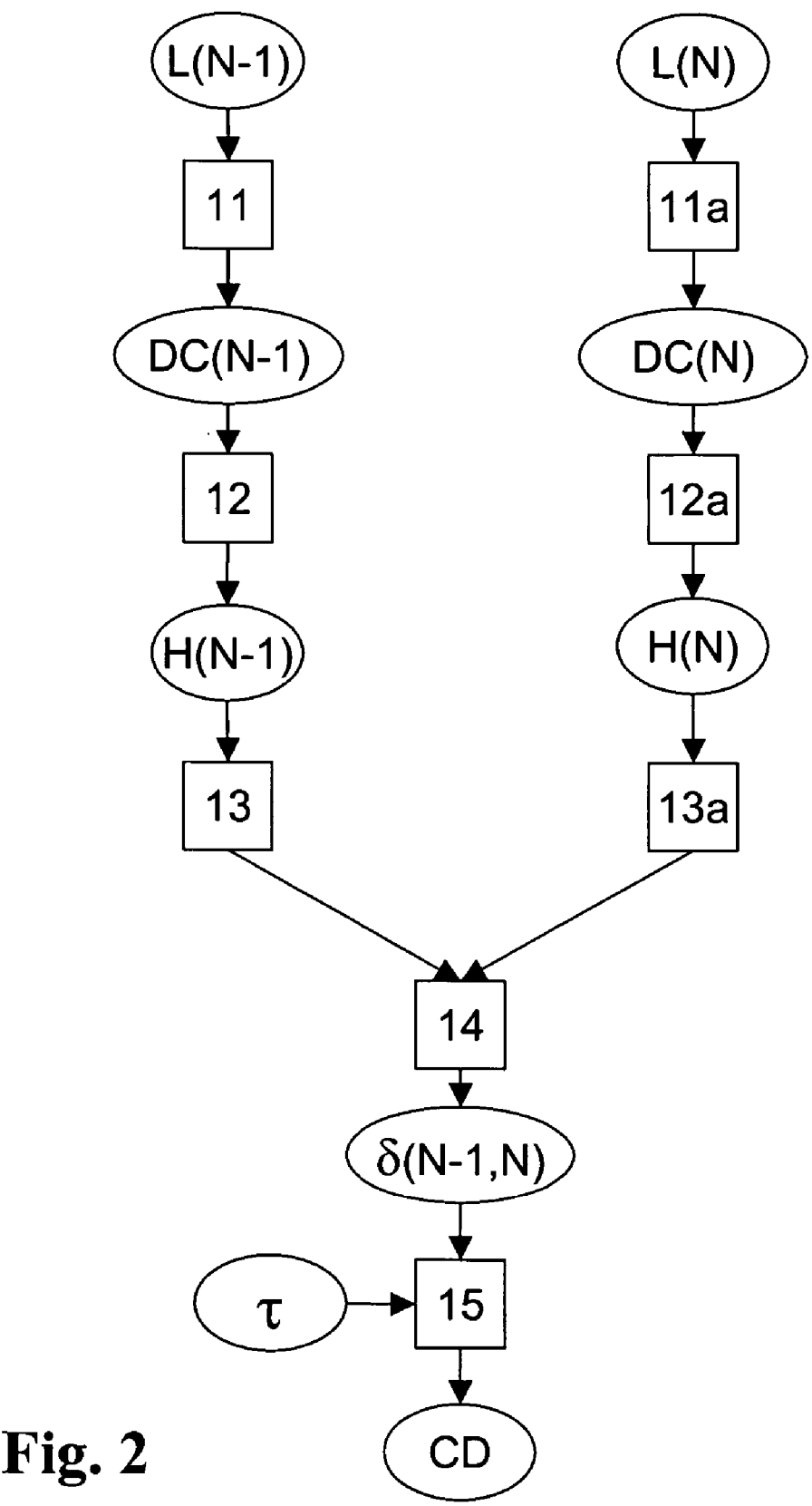
FIG. 2 shows a flowchart of an exemplary implementation of the boundary detection.

In FIG. 2 a flowchart for an exemplary implementation for detecting boundaries between two consecutive takes is shown. In this implementation, in a first step 11 luminance values of a first field L(N−1) are used to compute the field's DC values DC(N−1). The DC values may, e.g., be derived from a low resolution version of the image from the video sequence. If the video sequence is of the type compressed video, the DC values may be derived from the DC or low frequency coefficients of an image transform. The image transform may be a DCT (Discrete Cosine Transform), but the invention is not limited to this type of transform. In step 12 a first histogram H(N−1) is computed, and in step 13 the histogram H(N−1) is low-pass filtered. In a preferred embodiment, a 5-tap FIR (Finite Impulse Response) low-pass filter is used, but the invention is not limited to this type of filtering. In the same manner in step 11a the DC value DC(N) of a second field's luminance values L(N) are computed. A second histogram H(N) is computed in step 12a, and the second histogram is low-pass filtered in step 13a. In step 14 the distance δ(N−1, N) between the results of the low pass-filtering of steps 13 and 13a is calculated, and compared to a preset threshold value τ in step 15. The distance δ(N−1, N) is defined as the accumulation of bin-to-bin differences between consecutive images. If the distance δ(N−1, N) exceeds the threshold τ, a boundary is assumed to be found and a cut decision signal CD is issued.

Figure 3:
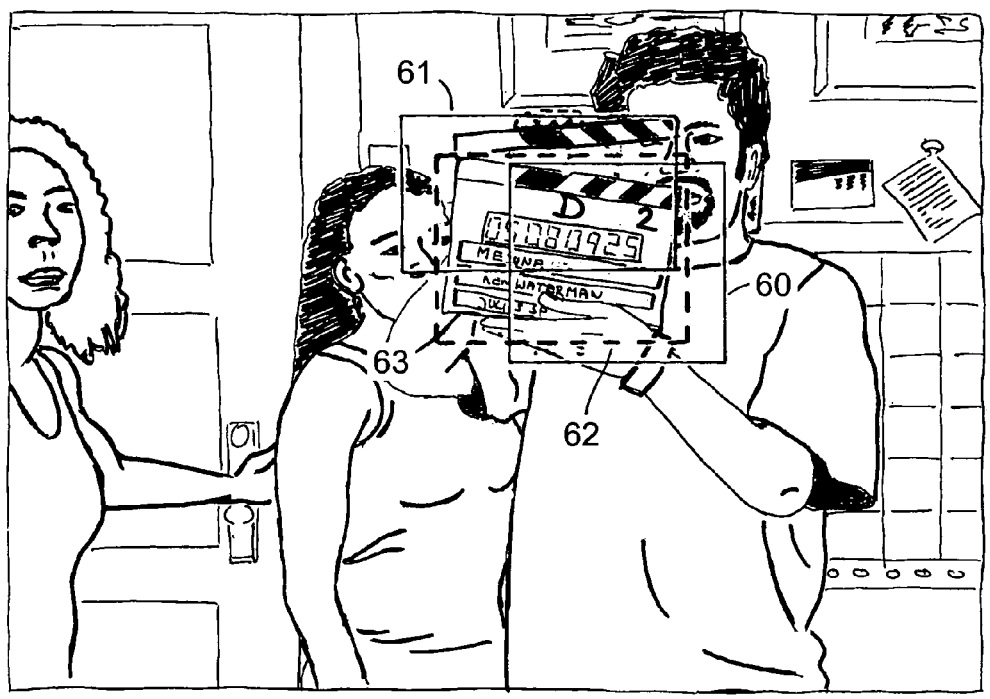
Figure 3A:
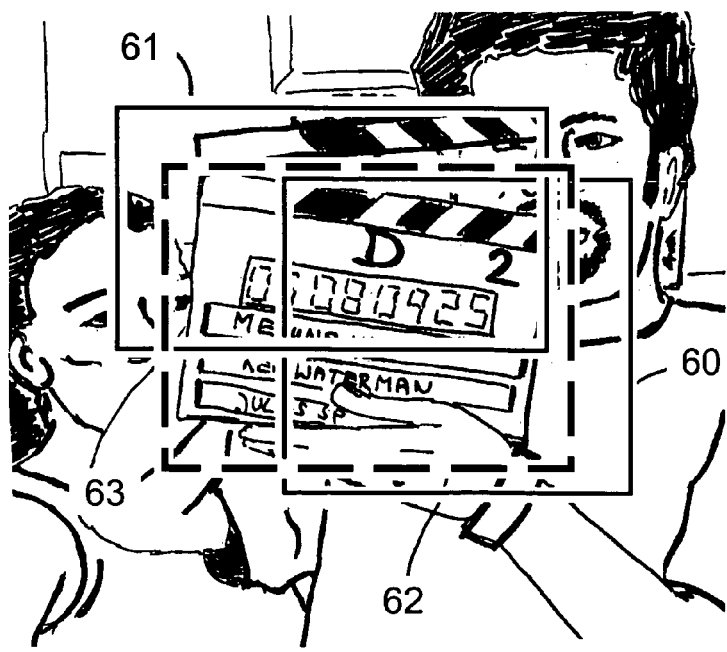
FIG. 3a shows a candidate image for slate detection with several candidate regions marked.

In FIG. 3*a* a candidate image for slate detection is shown. The image shown was taken from a 704×480 pixel image and was transferred into a sketch drawing for better readability. The image shows a typical scene of a film production at the beginning of a take. Candidate regions were searched for at 9 different sizes of scanning windows, with a 1:1.25 ratio between 2 successive scanning windows. The resulting scanning window size ranged from full image size to 117×79 pixels. The spatial increment during scanning was a quarter of the window size, resulting in a total of 1009 possible locations tested. Three candidate regions (60, 61, 62) are displayed over a detected slate (63). Comparing the slate (63) and the three candidate regions (60, 61, 62), the candidate region (62) shown in dashed line has the smallest visual distance to a stored reference feature value set.

FIG. 3*b* is an enlarged detail of FIG. 3*a* showing the slate candidate regions (60, 61, 62) as well as the slate (63).

Although the inventive method was described using a slate as an example, the invention is not limited to this special embodiment of a token. The invention is applicable to other conceivable tokens used in video production, such as a flashing display or the like.

What is claimed is:

1. A method for automatically identifying tokens associated with an event in video sequences containing individual takes and extracting information contained thereon including the steps of: classifying candidate regions in images of the sequence into token or non-token, locating tokens in candidate regions, locating information on the token, interpreting the information on the token, performing a confidence analysis on the information to ensure that the information was interpreted correctly, wherein the method further includes the steps of: detecting boundaries between individual takes, pre-selecting candidate regions in images of the video sequence following or preceding a detected boundary prior to the step of classifying the candidate regions, and that the method also further includes the steps of merging information of consecutive images into a single, coherent set of information, and detecting changes in the visual appearance of the token, the changes signaling a particular point of an event, after the step of performing the confidence analysis.

2. The method of claim 1, wherein after detecting a boundary between individual takes a timer is set, upon time-out thereof the identification process is terminated.

3. The method of claim 1, wherein detecting boundaries between individual takes includes the steps of: creating a histogram from image properties for consecutive images, calculating the distance between filtered histograms of consecutive images, comparing the calculated distance to a preset threshold, and issuing a signal indicating a boundary is detected upon the distance exceeding the threshold.

4. The method of claim 1, wherein pre-selecting candidate regions in candidate images includes the steps of: defining a reference feature value set corresponding to tokens, scanning the image at varying locations using a suitably shaped scanning window; computing a feature value set for each scanning window location, comparing each feature value set with the reference feature value set, and ranking the scanning windows containing feature value sets according to their distance to the reference feature value set.

5. The method of claim 1, wherein classifying the candidate regions into token or non-token includes the steps of: calculating feature values from the candidate regions, comparing the calculated feature values to known classified feature values of reference images, assigning classifiers to the respective candidate regions, and assigning a classification confidence value to the classified candidate regions.

6. The method of claim 1, wherein locating tokens in the candidate regions includes the steps of: scanning the candidate region using a suitably shaped scanning window, calculating coefficients describing the correlation between the scanning window and a reference image of a token, averaging the coefficients, thereby defining a matching confidence value, selecting the scanning window having the highest confidence value as candidate window.

7. The method of claim 6, wherein the scanning window and/or the reference image is decimated or interpolated in its spatial resolution prior to calculating the correlation coefficients, resulting in a corresponding number of pixels for the scanning window and the reference image.

8. The method of claim 6, wherein the candidate region is re-classified to non-token if the confidence value is below a preset threshold.

9. The method of claim 1, wherein locating information on the token includes the steps of: cutting a sub-image from the candidate image using size and position data from the token localization process, constructing a probability map of the sub-image describing the probability that a pixel of the sub-image belongs to information on the token, and selecting an area of the sub-image with maximum probability values.

10. The method of claim 9, wherein the probability is obtained by comparing pixel properties of the sub-image to pre-dellned pixel properties belonging to information elements.

11. The method of claim 1, wherein interpreting the information contained on the token includes the steps of: rotating the selected sub-image area with maximum probability to bring the information contained therein into horizontal orientation, binanzing the probability map values of the sub-image area, filtering the binarized map, and performing an optical character recognition on the filtered map.

12. The method of claim 1, wherein a confidence analysis is effected by checking information extracted from consecutive images for consistency.

13. The method of claim 1, wherein merging information elements includes replacing mismatching information elements and/or information elements having low confidence with interpolated information elements.

14. The method of claim 1, wherein detecting changes in the visual appearance of the token includes the steps of: detecting and locating parts of the token subject to change by analysing visual features in candidate regions and comparing the visual features to pre-determined visual features of tokens, monitoring the change in visual appearance of the parts subject to change by comparing detected visual features in consecutive images, and outputting data describing the degree of change with regard to a pre-determined starting and/or end point.

15. The method of claim 14, wherein the visual features are translated into simplified models for analysis and monitoring.

* * * * *